US012445976B2

United States Patent
Shi et al.

(10) Patent No.: US 12,445,976 B2
(45) Date of Patent: Oct. 14, 2025

(54) POWER HEADROOM REPORTING METHOD AND APPARATUS THEREFOR

(71) Applicant: GUANGDONG OPPO MOBILE TELECOMMUNICATIONS CORP., LTD., Guangdong (CN)

(72) Inventors: Zhihua Shi, Guangdong (CN); Wenhong Chen, Guangdong (CN); Yun Fang, Guangdong (CN); Yingpei Huang, Guangdong (CN); Zhi Zhang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 351 days.

(21) Appl. No.: 17/650,739

(22) Filed: Feb. 11, 2022

(65) Prior Publication Data

US 2022/0174614 A1    Jun. 2, 2022

Related U.S. Application Data

(63) Continuation of application No. PCT/CN2019/116693, filed on Nov. 8, 2019.

(51) Int. Cl.
    *H04W 52/36*    (2009.01)
    *H04W 52/14*    (2009.01)
    *H04W 80/02*    (2009.01)

(52) U.S. Cl.
    CPC ....... *H04W 52/365* (2013.01); *H04W 52/367* (2013.01); *H04W 80/02* (2013.01)

(58) Field of Classification Search
    CPC .. H04W 52/365; H04W 52/367; H04W 80/02
    (Continued)

(56) References Cited

U.S. PATENT DOCUMENTS

| 10,986,591 B2* | 4/2021 | MolavianJazi ..... H04W 52/367 |
| 2004/0147266 A1* | 7/2004 | Hwang ............... H04W 12/062 |
| | | 455/445 |

(Continued)

FOREIGN PATENT DOCUMENTS

| CN | 104936278 A | 9/2015 |
| CN | 105307259 A | 2/2016 |

(Continued)

OTHER PUBLICATIONS

First Office Action of the CN application No. 202210161887.7, issued on Jun. 15, 2023. 17 pages with English translation.

(Continued)

*Primary Examiner* — Mark G. Pannell
(74) *Attorney, Agent, or Firm* — PERKINS COIE LLP

(57) ABSTRACT

A power headroom reporting method, including: configuring a cell group by means of a network; configuring a sending power limit in the cell group, and for the cell group, corresponding to a first configuration maximum sending power and a second configuration maximum sending power, the first configuration maximum sending power being determined on the basis of the sending power limit, and the determination of the second configuration maximum sending power being irrelevant to the sending power limit; determining, according to a preset rule, to use the first configuration maximum sending power and/or the second configuration maximum sending power to obtain a power headroom report; and reporting the power headroom report.

11 Claims, 5 Drawing Sheets

(58) Field of Classification Search
USPC .......................................................... 370/318
See application file for complete search history.

(56) References Cited

U.S. PATENT DOCUMENTS

| | | | |
|---|---|---|---|
| 2010/0158147 A1* | 6/2010 | Zhang | H04W 52/242 455/522 |
| 2012/0196605 A1* | 8/2012 | Nagpal | H04W 36/0033 455/444 |
| 2012/0224552 A1* | 9/2012 | Feuersanger | H04L 5/0064 370/329 |
| 2012/0263060 A1* | 10/2012 | Suzuki | H04W 72/0473 370/254 |
| 2013/0010720 A1* | 1/2013 | Lohr | H04L 5/0057 370/329 |
| 2015/0282104 A1* | 10/2015 | Damnjanovic | H04W 52/365 455/522 |
| 2016/0112966 A1* | 4/2016 | Jung | H04W 52/34 370/311 |
| 2017/0019864 A1* | 1/2017 | Hwang | H04W 52/365 |
| 2017/0094612 A1 | 3/2017 | Dinan | |
| 2017/0111873 A1* | 4/2017 | Kakishima | H04W 52/143 |
| 2017/0142666 A1* | 5/2017 | Shimezawa | H04W 52/367 |
| 2017/0202025 A1* | 7/2017 | Ouchi | H04W 74/0833 |
| 2017/0230843 A1* | 8/2017 | Ouchi | H04W 52/325 |
| 2019/0053170 A1* | 2/2019 | Lee | H04W 72/23 |
| 2019/0223116 A1 | 7/2019 | Chen et al. | |
| 2019/0223117 A1* | 7/2019 | Chai | H04W 52/365 |
| 2020/0145934 A1* | 5/2020 | Wang | H04L 5/0094 |
| 2020/0154374 A1* | 5/2020 | Deng | H04W 52/383 |
| 2020/0213955 A1* | 7/2020 | Hosseini | H04W 72/0473 |
| 2020/0221396 A1* | 7/2020 | Wang | H04W 52/146 |
| 2020/0288412 A1* | 9/2020 | Ajdakple | H04W 52/42 |
| 2020/0367180 A1* | 11/2020 | Osawa | H04W 52/367 |
| 2021/0204227 A1* | 7/2021 | Bergljung | H04W 52/38 |
| 2021/0314883 A1* | 10/2021 | Latheef | H04W 52/365 |
| 2022/0240234 A1* | 7/2022 | Cao | H04L 5/0094 |

FOREIGN PATENT DOCUMENTS

| | | |
|---|---|---|
| CN | 105580452 A | 5/2016 |
| WO | 2019158011 A1 | 8/2019 |

OTHER PUBLICATIONS

Second Office Action of the CN application No. 202210161887.7, issued on Aug. 19, 2023. 19 pages with English translation.
Apple Inc. Feature lead summary #3 for uplink power control for NR-NR DC, 3GPP TSG-RAN WG1 #98bis Chongqing, China, Oct. 14-20, 2019, R1-1911661. 19 pages.
NSN, Nokia, UL power control and power headroom reporting for dual connectivity 3GPP TSG-RAN WG1 Meeting #76bis Shenzhen, China, Mar. 31-Apr. 4, 2014, R1-141536. 4 pages.
3GPP TSG RAN WG1 #98bis—R1-1910241—Chongqing, China, Oct. 14-20, 2019—vivo, Uplink power control for supporting NR-NR DC (3 pages).
3GPP TSG-RAN WG1 #98bis—R1-1911661p—Chongqing, China, Oct. 14-20, 2019—Apple Inc., Feature lead summary #3 for uplink power control for NR-NR DC (19 pages).
International Search Report issued Oct. 27, 2021 of PCT/CN2019/116693 (4 pages).
European Examination Report dated Mar. 3, 2023 of European Patent Application 19 951 979.4-1206 (6 pages).
Examination report for European Application No. 19951979.4 Issued on Sep. 8, 2023, 6 Pages.
Anonymous: "3rd Generation Partnership Project; Technical Specification Group Radio Access Network; NR; Medium Access Control (MAC) protocol specification (Release 15)",3GPP Standard; Technical Specification; 3GPP TS 38.321 V15.7.0; Sep. 2019. 78 pages.
Anonymous: "3rd Generation Partnership Project; Technical Specification Group Radio Access Network; NR; Radio Resource Control (RRC) protocol specification (Release 15)",3GPP Standard; Technical Specification; 3GPP TS 38.331 V15.7.0; Sep. 2019. 527 pages.
3GPP "E-Utra; MAC Protocol Specification (Release 15)" 3GPP TS 36.321 V15.7.0; 2019. 44 pages.
3GPP "E-UTRA; RRC; Protocol Specification (Release 15)" 3GPP TS 36.331 V15.7.0; 2019. 533 pages.
3GPP "Technical Specification—Release 15" 3GPP TS 36.101 V15.7.0; 2019. 491 pages.
3GPP "Technical Specification (Release 15)" 3GPP TS 36.213 V15.7.0; 2019. 51 pages.
Extended European Search Report for European Application No. 19951979.4 issued Jun. 29, 2022. 13 pages.

* cited by examiner

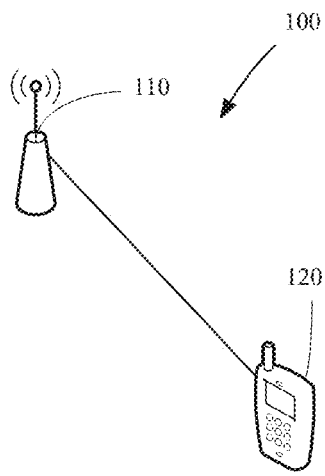
FIG. 1
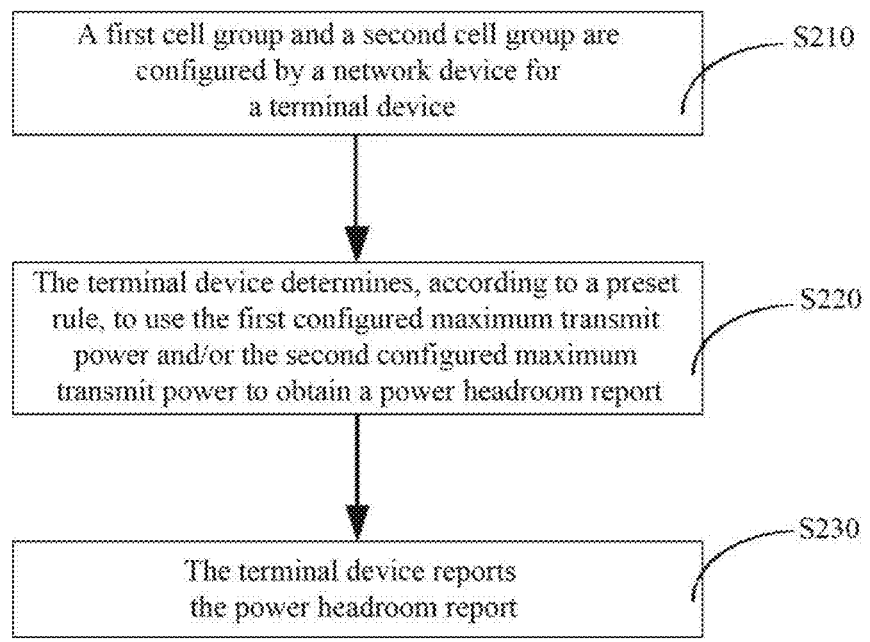
FIG. 2
FIG. 3A

| C₇ | C₆ | C₅ | C₄ | C₃ | C₂ | C₁ | R |
|---|---|---|---|---|---|---|---|
| P | V | \multicolumn{6}{l|}{PH (Type 2, SpCell of the other MAC entity)} |||||| |
| R | R | $P_{CMAX,f,c}$ 1 |||||| |
| P | V | PH (Type 1, PCell) |||||| |
| R | R | $P_{CMAX,f,c}$ 2 |||||| |
| P | V | PH (Type X, Serving Cell 1) |||||| |
| R | R | $P_{CMAX,f,c}$ 3 |||||| |

...

| | | |
|---|---|---|
| P | V | PH (Type X, Serving Cell n) |
| R | R | $P_{CMAX,f,c}$ m |

FIG. 3B

| | | |
|---|---|---|
| R | R | First power headroom PH |
| R | R | First configured maximum transmit power |
| R | R | Second power headroom PH |
| R | R | Second configured maximum transmit power |

FIG. 4

POWER HEADROOM REPORTING METHOD AND APPARATUS THEREFOR

CROSS-REFERENCE TO RELATED APPLICATION

The present application is a continuation application of International PCT Application No. PCT/CN2019/116693, filed on Nov. 8, 2019, the entire content of which is hereby incorporated by reference.

TECHNICAL FIELD

The present disclosure relates to the field of communication technology, and more particularly, to the technical field of power headroom reporting.

BACKGROUND

In NR-NR (New Radio) DC (Dual Connectivity), there are two types of power sharing (or known as power control) solutions: a semi-static power sharing solution and a dynamic power sharing solution.

In NR-NR DC, a network device configures two cell groups (CGs), a master cell group (MCG) and a secondary cell group (SCG), for User Equipment (UE). The network device will also configure a transmit power upper limit $P_{MCG}$ at the MCG and a transmit power upper limit $P_{SCG}$ at the SCG for the UE.

For the semi-static power sharing solution, the UE can work in one of the following two sub-solutions through configuring.

In sub-solution 1, during actual transmission, actual transmit powers of the UE in uplink transmissions corresponding to the MCG and the SCG cannot exceed the corresponding transmit power upper limits $P_{MCG}$ and $P_{SCG}$ configured by the network device.

In sub-solution 2, if an uplink transmission resource on a certain CG overlaps with a semi-statically configured downlink (DL) symbol on another CG, the maximum transmit power on this CG can reach a transmit power upper limit of the UE; this upper limit is determined by RAN4, at this point $P_{MCG}$ and $P_{SCG}$ do not need to be considered when the configured maximum transmit power $P_{CMAX,f,c}$ on this CG is calculated. On the contrary, if uplink transmission on a certain CG overlaps with a semi-statically configured uplink or flexible symbol on another CG, its actual transmit power cannot exceed its corresponding upper limit, at this point $P_{MCG}$ and $P_{SCG}$ need to be considered when $P_{CMAX,f,c}$ on this CG is calculated.

For the dynamic power sharing/control solution, if uplink transmission on a certain CG overlaps with uplink transmission on another CG, actual transmit power on the corresponding CG cannot exceed its corresponding upper limit, at this point $P_{MCG}$ and $P_{SCG}$ need to be considered when $P_{CMAX,f,c}$ on this CG is calculated. If uplink transmission on a certain CG does not overlap with uplink transmission on another CG, the maximum transmit power on this CG can reach the transmit power upper limit of the UE, at this point $P_{MCG}$ and $P_{SCG}$ do not need to be considered when $P_{CMAX,f,c}$ on this CG is calculated.

To sum up, whether in the semi-static power sharing solution or the dynamic power sharing solution, the transmit power upper limit of the corresponding cell group needs to be considered when the configured maximum transmit power is calculated. When there are two cell groups, there will be two transmit power upper limits, i.e., $P_{MCG}$ and $P_{SCG}$. Then, different values of the configured maximum transmit power $P_{CMAX,f,c}$ will be calculated according to different transmit power upper limits $P_{MCG}$ and $P_{SCG}$, so power headroom calculated by the UE according to the configured maximum transmit power $P_{CMAX,f,c}$ will be different, thereby resulting in the problem of uncertain power headroom.

SUMMARY

The present disclosure provides a method and apparatus for power headroom reporting, so as to solve the problem of uncertain power headroom during uplink transmission.

The present disclosure provides the following technical solutions.

A method for power headroom reporting includes: configuring a cell group by a network device for a terminal device, wherein the cell group is configured with a transmit power limit, and the terminal device corresponds to a first configured maximum transmit power and a second configured maximum transmit power for the cell group; wherein the first configured maximum transmit power is determined based on the transmit power limit, and determination of the second configured maximum transmit power is irrelevant to the transmit power limit; determining, by the terminal device, according to a preset rule, to use the first configured maximum transmit power and/or the second configured maximum transmit power to obtain a power headroom report; and reporting, by the terminal device, the power headroom report.

A method for power headroom reporting includes: configuring, by a network device, a cell group for a terminal device, wherein the cell group is configured with a transmit power limit, and the terminal device corresponds to a first configured maximum transmit power and a second configured maximum transmit power for the cell group; wherein the first configured maximum transmit power is determined based on the transmit power limit, and determination of the second configured maximum transmit power is irrelevant to the transmit power limit; sending, by the network device, configuration information to the terminal device, to enable the terminal device to determine, according to the configuration information, to use the first configured maximum transmit power and/or the second configured maximum transmit power to obtain a power headroom report; and receiving, by the network device, the power headroom report reported by the terminal device.

An apparatus for power headroom reporting includes: a cell configuring unit configured to determine a cell group configured by a network device, wherein the cell group is configured with a transmit power limit, and the apparatus corresponds to a first configured maximum transmit power and a second configured maximum transmit power for the cell group; wherein the first configured maximum transmit power is determined based on the transmit power limit, and determination of the second configured maximum transmit power is irrelevant to the transmit power limit; a determining unit configured to determine, according to a preset rule, to use the first configured maximum transmit power and/or the second configured maximum transmit power to obtain a power headroom report; and a reporting unit configured to report the power headroom report.

An apparatus for power headroom reporting includes: a network configuring unit configured to configure a cell group for a terminal device, wherein the cell group is configured with a transmit power limit, and the terminal device corresponds to a first configured maximum transmit power and a second configured maximum transmit power for the cell group; wherein the first configured maximum transmit power is determined based on the transmit power limit, and determination of the second configured maximum transmit power is irrelevant to the transmit power limit; an indicating unit configured to send configuration information to the terminal device to indicate the terminal device to determine, according to the configuration information, to use the first configured maximum transmit power and/or the second configured maximum transmit power to obtain a power headroom report; and a report receiving unit configured to receive the power headroom report reported by the terminal device.

An uplink transmission apparatus includes a processor, a memory and a network interface; the processor invokes a program in the memory to execute a method for power headroom reporting disclosed in any implementation, and send out an execution result through the network interface.

A chip includes a processor for invoking and running a computer program from a memory, and a device having the chip installed thereon executes a method for power headroom reporting disclosed in any implementation.

A computer-readable storage medium has stored therein a program for executing a method for power headroom reporting, which, when executed by a processor, implements a method for power headroom reporting disclosed in any implementation.

A computer program product is stored in a non-transitory computer-readable storage medium, wherein a computer program, when executed, implements a method for power headroom reporting disclosed in any implementation.

Beneficial effects of the present disclosure lie in that during uplink transmission, the terminal device determines, through some rule, to adopt which mode to calculate the power headroom and determines specific contents of the power headroom reporting, thereby solving the problem of uncertainties in the calculation of the power headroom in uplink transmission.

BRIEF DESCRIPTION OF DRAWINGS

FIG. 1 is a system architecture diagram applied in an implementation of the present disclosure.

FIG. 2 is a flowchart of a method for power headroom reporting in accordance with the first implementation of the present disclosure.

FIG. 3A is a schematic diagram of MAC CE signaling format 1 in accordance with the first implementation of the present disclosure.

FIG. 3B is a schematic diagram of MAC CE signaling format 2 in accordance with the first implementation of the present disclosure.

FIG. 4 is a schematic diagram in which combinational information 1) is reported using MAC CE signaling format 1.

DETAILED DESCRIPTION

Figure 5A:
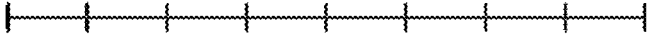
FIGS. 5A and 5B are schematic diagrams in which combinational information 4) is reported using MAC CE signaling format 1.

In order to make objects, technical solutions and advantages of the present disclosure clearer, the present disclosure will be described in further detail below in conjunction with the drawings and implementations. It should be understood that the implementations described herein are only for the purpose of explaining the present disclosure but are not intended to limit the present disclosure. However, the present disclosure may be implemented in many different forms but is not limited to the specific implementations described herein. On the contrary, the purpose of providing these implementations is to make the understanding of the disclosed contents of the present disclosure more thorough and comprehensive.

Unless otherwise defined, all technical and scientific terms used herein have same meanings as those commonly understood by those skilled in the technical field of the present disclosure. Terms used in the description of the present disclosure herein are for the purpose of describing specific implementations only, but are not intended to limit the present disclosure. The term "and/or" used herein includes any and all of combinations of one or more related listed items.

Referring to FIG. 1, it shows a wireless communication system 100 applied in an implementation of the present disclosure. The wireless communication system includes a network device 110 and at least one terminal device 120 located in a coverage area of the network device 110.

Optionally, the wireless communication system 100 may include a plurality of network devices, and another quantity of terminal devices may be included within the coverage area of each network device, which is not limited in the implementations of the present disclosure.

The wireless communication system 100 in the implementations of the present disclosure may be the following various communication systems, such as a Global System of Mobile Communication (GSM) system, a Code Division Multiple Access (CDMA) system, a Wideband Code Division Multiple Access (WCDMA) system, a General Packet Radio Service (GPRS), a Long Term Evolution (LTE) system, an Advanced Long Term Evolution (LTE-A) system, a New Radio (NR) system, an evolution system of the NR system, an LTE-based access to unlicensed spectrum (LTE-U) system, an NR-based access to unlicensed spectrum (NR-U) system, a Universal Mobile Telecommunications System (UMTS), Wireless Local Area Networks (WLANs), Wireless Fidelity (WiFi), a next generation communication system, or other communication systems.

Optionally, the communication system in the implementations of the present disclosure may be applied to a Carrier Aggregation (CA) scenario, or a Dual Connectivity (DC) scenario, or a Standalone (SA) network deployment scenario.

The network device 110 may provide communication coverage for a specific geographical area, and may communicate with the terminal devices (e.g., UE) located within the coverage area. Optionally, the network device 100 may be a Base Transceiver Station (BTS) in a GSM system or CDMA system, a NodeB (NB) in a WCDMA system, an Evolutional Node B (eNB or eNodeB) in an LTE system, or a radio controller in a Cloud Radio Access Network (CRAN), or the network device may be a relay station, an access point, a vehicle-mounted device, a wearable device, a network side device in a 5G network, or a network device in a future evolved Public Land Mobile Network (PLMN).

The terminal device 120 may be mobile or fixed. Optionally, the terminal device 120 may refer to an access terminal, User Equipment (UE), a subscriber unit, a subscriber station, a mobile station, a rover station, a remote station, a remote terminal, a mobile device, a user terminal, a terminal, a wireless communication device, a user agent, or a user apparatus. The access terminal may be a cellular phone, a cordless phone, a Session Initiation Protocol (SIP) phone, a Wireless Local Loop (WLL) station, a Personal Digital Assistant (PDA), a handheld device with a wireless communication function, a computing device, or other processing devices connected to a wireless modem, a vehicle-mounted device, a wearable device, a terminal device in a 5G network, or a terminal device in a future evolved Public Land Mobile Network (PLMN).

In the following specific implementations of the present disclosure, it will be revealed how a mode for calculating power headroom is determined in NR-NR DC, and the power headroom is determined to be reported according to the determined mode for calculating the power headroom.

The First Implementation

Referring to FIG. 2, it shows a method for power headroom reporting in accordance with the first implementation of the present disclosure, which includes the following acts S210-S230.

In S210, a cell group (CG) is configured by a network device for a terminal device, wherein the cell group is configured with a transmit power limit $P_{CG1}$, specifically, a transmit power limit $P_{CG1}$ configured by the network device for the cell group; and the terminal device corresponds to a first configured maximum transmit power and a second configured maximum transmit power for the cell group; wherein the first configured maximum transmit power is determined based on the transmit power limit $P_{CG1}$, and determination of the second configured maximum transmit power is irrelevant to the transmit power limit $P_{CG1}$. In the present disclosure, the so-called irrelevance means that the transmit power limit $P_{CG1}$ is not included in a parameter used when the second configured maximum transmit power is calculated, in other words, the transmit power limit $P_{CG1}$ is not taken into account when the second configured maximum transmit power is calculated.

It should be noted that the implementations of the present disclosure can be applied to a scenario where two cell groups are configured by the network device for the terminal device, that is, a first cell group and a second cell group are configured by the network device for the terminal device. When there is overlapping in uplink transmission of the terminal device in the first cell group and the second cell group, then there will be two configured maximum transmit powers (i.e. the first configured maximum transmit power and the second configured maximum transmit power described above) in the uplink transmission of the terminal device in one of the cell groups (such as the first cell group). Of course, the implementations of the present disclosure are not limited to be applied to this scenario. As long as there are at least two configured maximum transmit powers for the terminal device in a cell group, resulting in uncertainties in the mode of calculating the power headroom, the technical solutions provided by the implementations of the present disclosure can be used.

In S220, the terminal device determines, according to a preset rule, to use the first configured maximum transmit power and/or the second configured maximum transmit power to obtain a power headroom report.

In S230, the terminal device reports the power headroom report.

Optionally, the power headroom report is reported through medium access control control element (MAC CE) signaling. Referring to FIG. 3A and FIG. 3B, they show MAC CE signaling formats for reporting the power headroom report. FIG. 3A shows MAC CE signaling format 1, R represents a reserved bit, PH represents power headroom information, and $P_{CMAX,f,c}$ represents a maximum transmit power. FIG. 3B shows MAC CE signaling format 2, R represents a reserved bit, PH represents power headroom information, $P_{CMAX,f,c}$ represents a maximum transmit power, P indicates information related to calculation of the power headroom, V indicates information related to calculation of $P_{CMAX,f,c}$, and C7-C1 respectively indicate, through one bit, whether the power headroom and the maximum transmit power of a corresponding cell are reported, that is, whether the power headroom and the maximum transmit power are carried in this signaling.

Optionally, S220 of determining, by the terminal device, according to the preset rule, to use the first configured maximum transmit power and/or the second configured maximum transmit power to obtain the power headroom report includes S223.

In S223, the terminal device determines, according to the preset rule, to use at least one of the following modes to determine the power headroom report.

In a first mode, the terminal device calculates a first power headroom by using the first configured maximum transmit power; the power headroom report includes the first power headroom and/or the first configured maximum transmit power.

In a second mode, the terminal device calculates a second power headroom by using the second configured maximum transmit power; the power headroom report includes the second power headroom and/or the second configured maximum transmit power.

Optionally, S223 of determining, by the terminal device, according to the preset rule, to use at least one of the following modes to determine the power headroom report includes:

determining, by the terminal device, according to a protocol, to use the first mode and/or the second mode to determine the power headroom report.

An advantage of the first mode lies in that a case where a transmission power is low, that is, a case where a transmission limit is increased additionally, is taken into key account, so as to ensure that the network knows the worst case, so that the network device performs corresponding optimization.

An advantage of the second mode lies in that a case where a transmission power is high, that is, a case where a transmission limit is less, is taken into key account, so as to ensure that the network device can make full use of transmit power, improving the network throughput.

An advantage of using both the first and second modes to determine the power headroom report lies in that both the case where the transmission power is low and the case where the transmission power is high are taken into account, which is more comprehensive.

Optionally, S223 of determining, by the terminal device, according to the preset rule, to use at least one of the following modes to determine the power headroom report includes: determining, by the terminal device, according to configuration information, to use the first mode and/or the second mode to determine the power headroom report. An advantage of determining the mode of reporting the power headroom according to the configuration information lies in that the flexibility of the network is increased and an optimization space is provided for the improvement of network performance.

When the terminal device determines the mode of reporting the power headroom according to the configuration information in S223, optionally, S220 of determining, by the terminal device, according to the preset rule, to use the first configured maximum transmit power and/or the second configured maximum transmit power to obtain the power headroom report further includes S221.

In S221, the configuration information sent by the network device is received, wherein the configuration information is used for indicating the terminal device to determine, according to the configuration information, to use the first configured maximum transmit power and/or the second configured maximum transmit power to obtain the power headroom report.

Optionally, both the first mode and the second mode are adopted, and the power headroom report can be any one of the following combinational information:

the first power headroom, and/or the first configured maximum transmit power; and the second power headroom, and/or the second configured maximum transmit power.

Optionally, the power headroom report is determined by using both the first mode and the second mode, and the power headroom report can be any one of the following combinational information:

1) the first power headroom, the second power headroom, the first configured maximum transmit power, and the second configured maximum transmit power;
2) the first configured maximum transmit power and the second configured maximum transmit power;
3) the first power headroom and the second power headroom;
4) the first power headroom, the second power headroom, and the first configured maximum transmit power;
5) the first power headroom, the second power headroom, and the second configured maximum transmit power;
6) the first power headroom, the first configured maximum transmit power, and the second configured maximum transmit power; and
7) the second power headroom, the first configured maximum transmit power, and the second configured maximum transmit power.

Compared with the combinational information 1), an advantage of the combinational information 2) to 7) above lies in that the reported information can be reduced and the overhead can be reduced.

Optionally, the network configuration is sent to the terminal device through radio resource control (RRC) signaling or medium access control control element (MAC CE) signaling.

Referring to FIG. 4, it shows a power headroom report in which combinational information 1) is reported by using MAC CE signaling format 1.

Figure 5B:
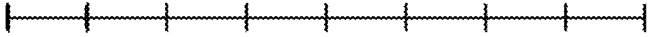

Referring to FIGS. 5A and 5B, they show power headroom reports in which combinational information 4) is reported by using MAC CE signaling format 1.

Figure 6A:
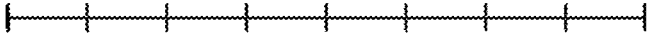
FIGS. 6A and 6B are schematic diagrams in which combinational information 5) is reported using MAC CE signaling format 1.
Figure 6B:
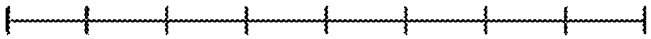

Referring to FIGS. 6A and 6B, they show power headroom reports in which combinational information 5) is reported by using MAC CE signaling format 1.

Figure 7:
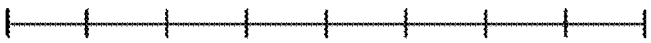
FIG. 7 is a schematic diagram in which combinational information 6) is reported using MAC CE signaling format 1.

Referring to FIG. 7, it shows a power headroom report in which combinational information 6) is reported by using MAC CE signaling format 1.

Figure 8A:
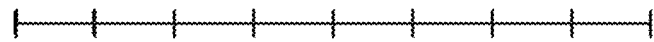
FIGS. 8A and 8B are schematic diagrams in which combinational information 7) is reported using MAC CE signaling format 1.
Figure 8B:
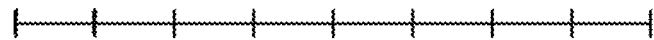

Referring to FIGS. 8A and 8B, they show power headroom reports in which combinational information 7) is reported by using MAC CE signaling format 1.

An example of reporting the power headroom report by using MAC CE signaling format 2 is the same as or similar to the example of reporting the power headroom report by using MAC CE signaling format 1, which is given only in the first implementation, and will not be repeated herein.

The contents shown in FIGS. 4 to 8 above are only some of the examples, herein an order in which information is reported can be more other orders. Optionally, an order, in which the information is arranged, in the MAC CE signaling can be preset by a protocol; which type of information the corresponding information is can also be indicated by using reserved bits in an MAC CE signaling format. Specifically, as shown in FIG. 9 below, the original reserved bits R are used for indicating whether the corresponding information is the first power headroom or the second power headroom, and whether it is the first configured maximum transmit power or the second configured maximum transmit power.

Optionally, S223 of determining, by the terminal device, according to the preset rule, to use at least one of the following modes to determine the power headroom report includes:

determining, by the terminal device, according to a type of the power headroom report, to use the first mode and/or the second mode to determine the power headroom report. Its advantage lies in that different reporting modes are determined according to different types of the report, so that the network can know more information and provide more optimization spaces for parameter configuration and scheduling.

The types of the power headroom report include type 1 PHR and type 3 PHR. Optionally, the type 1 PHR adopts the first mode to determine the power headroom report, and the type 3 PHR adopts the second mode to determine the power headroom report. Optionally, the type 1 PHR adopts the second mode and the type 3 PHR adopts the first mode.

For the type 1 PHR, the power headroom is determined according to a difference between the configured maximum transmit power $P_{cmax,f,c}$ (nominal UE maximum transmit power or configured maximum output power) of the terminal device and the transmit power of data channel (the estimated power for UL-SCH transmission), wherein c represents a serving cell, and f represents a carrier f of the serving cell c. For example, when there is supplementary UL (SUL), one serving cell has two carriers. The terminal device can calculate the power headroom (PH) according to actual PUSCH transmission, or calculate the power headroom according to reference PUSCH transmission, that is, no actual PUSCH transmission occurs, and the power headroom is calculated according to some parameters corresponding to the PUSCH transmission.

For the type 3 PHR, the power headroom is determined according to a difference between the configured maximum transmit power $P_{CMAX,f,c}$ of the terminal device and channel sounding reference signal (SRS) transmit power. The terminal device can calculate the power headroom according to actual SRS transmission, or calculate the power headroom according to reference SRS transmission, that is, the actual SRS transmission does not occur, and the power headroom is calculated according to some parameters corresponding to the SRS transmission. The configured maximum transmit power includes the first configured maximum transmit power and/or the second configured maximum transmit power.

Optionally, S223 of determining, by the terminal device, according to the preset rule, to use at least one of the following modes to determine the power headroom report includes:

determining, by the terminal device, according to whether the power headroom report is calculated based on actual transmission or reference transmission, to use the first mode and/or the second mode to determine the power headroom report. Its advantage lies in that different information is reported according to the power headroom calculated based on the actual transmission or the reference transmission, so that the network can know more information and provide more optimization spaces for parameter configuration and scheduling.

Optionally, if the power headroom report is calculated based on the actual transmission, it is determined to use the first mode to determine the power headroom report; and/or if the power headroom report is calculated based on the reference transmission, it is determined to use the second mode to determine the power headroom report.

Optionally, if the power headroom report is calculated based on the actual transmission, it is determined to use the second mode to determine the power headroom report; and/or if the power headroom report is calculated based on the reference transmission, it is determined to use the first mode to determine the power headroom report. Optionally, determining, by the terminal device, according to whether the power headroom report is calculated based on the actual transmission or the reference transmission, to use the first mode and/or the second mode to determine the power headroom report includes:

if the power headroom report is calculated based on the reference transmission, using, by the terminal device, the second mode to determine the power headroom report; or if the power headroom report is calculated based on the actual transmission, when the actual transmission is overlapped with transmission or potential transmission on a second cell group in the time domain, using, by the terminal device, the first mode to determine the power headroom report; otherwise, using, by the terminal device, the second mode to determine the power headroom report. The potential transmission on the second cell group means that at least one symbol in the second cell group is configured as an uplink symbol or a flexible symbol, or at least one symbol in at least one NR serving cell in the second cell group is configured as an uplink symbol or a flexible symbol. Its advantage lies in that for the reference transmission, the second mode can be directly adopted because the case where in actual transmission, the transmit power is high does not occur; for the actual transmission, information that matches the actual transmission can be provided for the network according to the situation of the actual transmission, to provide more optimization spaces for parameter configuration and scheduling.

Optionally, S223 of determining, by the terminal device, according to the preset rule, to use at least one of the following modes to determine the power headroom report includes:

choosing voluntarily, by the terminal device, to use the first mode and/or the second mode to determine the power headroom report. Optionally, the terminal device indicates in the power headroom report that the power headroom report is determined by using the first mode and/or the second mode. Its advantage lies in that UE knows situations of a sender better, so as to choose more appropriate information to report and help the network to know the specific situation.

Figure 9A:
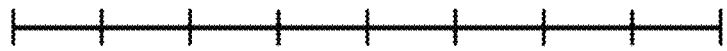
FIGS. 9A to 9C are schematic diagrams in which MAC CE signaling format 1 is used when a terminal device chooses voluntarily a mode of reporting power headroom.
Figure 9B:
Figure 9C:
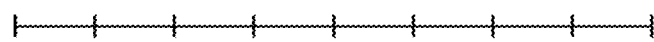

Referring to FIGS. 9A to 9C, in which the power headroom report is reported by using MAC CE signaling format 1 when the terminal device chooses voluntarily the mode of reporting the power headroom. At least one of the reserved bits in MAC CE signaling format 1 is used to indicate whether it is the first power headroom or the second power headroom, and whether it is the first configured maximum transmit power or the second configured maximum transmit power.

Specifically, in FIG. 9A, F indicates whether it corresponds to the first power headroom/the first configured maximum transmit power or the second power headroom/the second configured maximum transmit power. F can be any one of four reserved bits R.

In FIG. 9B, the first F indicates whether it is the first power headroom or the second power headroom, and the first F can be one of two reserved bits R in the first row; the second F indicates whether it is the first configured maximum transmit power or the second configured maximum transmit power, and the second F can be any one of two reserved bits R in the second row.

In FIG. 9C, the first F indicates whether it is the first power headroom or the second power headroom, and F can be any one of two reserved bits R in the first row; the second F indicates whether it is the first configured maximum transmit power or the second configured maximum transmit power, and the second F can be any one of two reserved bits R in the second row; the third F indicates whether it corresponds to the first power headroom or the second power headroom, and the third F can be any one of two reserved bits R in the third row; the fourth F indicates whether it corresponds to the first configured maximum transmit power or the second configured maximum transmit power, and the fourth F can be any one of two reserved bits R in the fourth row.

An example of reporting the power headroom report by using MAC CE signaling format 2 is the same as or similar to the example of reporting the power headroom report by using MAC CE signaling format 1, which is given only in the first implementation, and will not be repeated herein.

Optionally, S223 of determining, by the terminal device, according to the preset rule, to use at least one of the following modes to determine the power headroom report includes:

using, by the terminal device, the first configured maximum transmit power to calculate the first power headroom. When the first power headroom is less than or equal to 0, the terminal device determines the power headroom report by using the second mode; otherwise, the terminal device determines the power headroom report by using the first mode. Its advantage lies in that the reported information is changed flexibly according to the current transmission situation, to provide more reliable information for network optimization.

Optionally, the transmit power limit is configured in a radio resource control information element (RRC IE). Specifically, the transmit power limit is configured in PhysicalCellGroupConfig of the RRC IE. Optionally, the first transmit power limit PCG1 is configured through one of the following RRC parameters: p-MCG-FR1, p-SCG-FR1, p-MCG-FR2, p-SCG-FR2, p-NR-FR1 and p-NR-FR2.

Optionally, when two cell groups, i.e., the first cell group and the second cell group, are configured for the terminal device, the first cell group and the second cell group are in the same frequency band. Specifically, both the first cell group and the second cell group are in an FR1 frequency band; or both the first cell group and the second cell group are in an FR2 frequency band. The FR1 frequency band is 410 MHz-7125 MHz; the FR2 frequency band is 24250 MHz-52600 MHz.

Optionally, a power sharing mode between the first cell group and the second cell group is configured by the network device or reported by the terminal device. Optionally, the power sharing mode is configured by an RRC parameter. Specifically, the RRC parameter is NR-DC-PC-mode, which is configured in RRC IE PhysicalCellGroupConFIG.

Optionally, the power headroom report is transmitted through the first cell group or the second cell group.

In the first implementation of the present disclosure, during uplink transmission, the terminal device determines, through some rule, to adopt which mode to calculate the power headroom and determines specific contents of reporting of the power headroom, thereby solving the problem of uncertainties in the calculation of the power headroom.

The Second Implementation

Figure 10:
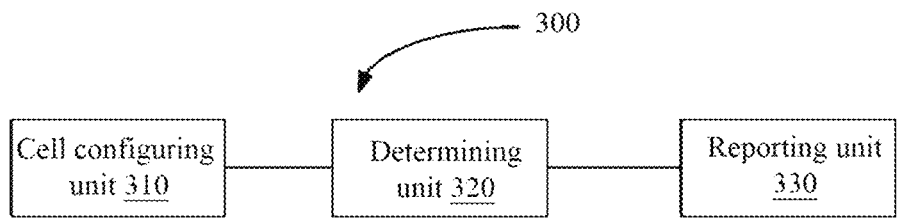
FIG. 10 is a block diagram of an apparatus for power headroom reporting in accordance with the second implementation of the present disclosure.

Referring to FIG. 10, it shows an apparatus 300 for power headroom reporting in accordance with the second implementation of the present disclosure. The apparatus includes: a cell configuring unit 310, a determining unit 320, and a reporting unit 330.

The cell configuring unit 310 is configured to determine a cell group configured by a network, wherein the cell group is configured with a transmit power limit $P_{CG1}$, and the apparatus 300 corresponds to a first configured maximum transmit power and a second configured maximum transmit power for the cell group; wherein the first configured maximum transmit power is determined based on the transmit power limit $P_{CG1}$, and determination of the second configured maximum transmit power is irrelevant to the transmit power limit $P_{CG1}$.

The determining unit 320 is configured to determine, according to a preset rule, to use the first configured maximum transmit power and/or the second configured maximum transmit power to obtain a power headroom report.

The reporting unit 330 is configured to report the power headroom report.

Optionally, the determining unit 320 is specifically configured to determine, according to the preset rule, to use at least one of the following modes to determine the power headroom report.

In a first mode, the first power headroom is calculated by using the first configured maximum transmit power; the power headroom report includes the first power headroom and/or the first configured maximum transmit power.

In a second mode, the second power headroom is calculated by using the second configured maximum transmit power; the power headroom report includes the second power headroom and/or the second configured maximum transmit power.

Optionally, the determining unit 320 is specifically configured to determine, according to the protocol, to use the first mode and/or the second mode to determine the power headroom report.

Optionally, the determining unit 320 is specifically configured to determine, according to network configuration, to use the first mode and/or the second mode to determine the power headroom report.

The power headroom report includes any one of the following combinational information:
the first power headroom and the first configured maximum transmit power;
the second power headroom and the second configured maximum transmit power;
the first power headroom and the second power headroom;
the first power headroom, the second power headroom, the first configured maximum transmit power, and the second configured maximum transmit power;
the first power headroom, the second power headroom, and the first configured maximum transmit power;
the first power headroom, the second power headroom, and the second configured maximum transmit power;
the first power headroom, the first configured maximum transmit power, and the second configured maximum transmit power; and
the second power headroom, the first configured maximum transmit power, and the second configured maximum transmit power.

Optionally, the network configuration is sent to the terminal device through radio resource control (RRC) signaling or medium access control control element (MAC CE) signaling.

Optionally, the reporting unit 330 is specifically configured to report the power headroom report through the MAC CE signaling. Wherein an order, in which the information is arranged, in the MAC CE signaling is preset by a protocol; and/or reserved bits in an MAC CE signaling format are used for indicating that the corresponding information is one of the first power headroom, the second power headroom, the first configured maximum transmit power, and the second configured maximum transmit power.

Optionally, the determining unit 320 is specifically configured to determine, according to a type of the power headroom report, to use the first mode and/or the second mode to determine the power headroom report.

Optionally, the determining unit 320 is specifically configured to determine, according to whether the power headroom report is calculated based on actual transmission or reference transmission, to use the first mode and/or the second mode to determine the power headroom report.

Optionally, the determining unit 320 is specifically configured to, if the power headroom report is calculated based on the reference transmission, use the second mode to determine the power headroom report; or if the power headroom report is calculated based on the actual transmission, when the actual transmission is overlapped with transmission or potential transmission on a second cell group in the time domain, use the first mode to determine the power headroom report, otherwise, use the second mode to determine the power headroom report.

Optionally, the determining unit 320 is specifically configured to choose voluntarily to use the first mode and/or the second mode to determine the power headroom report.

Optionally, the determining unit 320 is further configured to indicate in the power headroom report that the first mode and/or the second mode is used for determining the power headroom report.

Optionally, the determining unit 320 is specifically configured to calculate the first power headroom by using the first configured maximum transmit power; use the second mode to determine the power headroom report when the first power headroom is less than or equal to 0; otherwise, use the first mode to determine the power headroom report.

For nonexhaustive contents in the second implementation, reference is made to the same or corresponding portions in the first implementation described above, and this will not be repeated herein.

The Third Implementation

Figure 11:
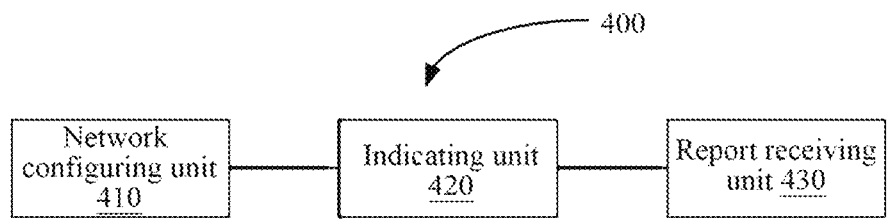
FIG. 11 is a block diagram of an apparatus for power headroom reporting in accordance with the third implementation of the present disclosure.

Referring to FIG. 11, it is a block diagram of an apparatus 400 for power headroom reporting in accordance with the third implementation of the present disclosure. The apparatus includes: a network configuring unit 410, an indicating unit 420, and a report receiving unit 430.

The network configuring unit 410 is configured to configure a cell group for a terminal device, wherein the cell group is configured with a transmit power limit $P_{CG1}$, and the terminal device corresponds to a first configured maximum transmit power and a second configured maximum transmit power for the cell group; wherein the first configured maximum transmit power is determined based on the transmit power limit $P_{CG1}$, and determination of the second configured maximum transmit power is irrelevant to the transmit power limit $P_{CG1}$.

The indicating unit 420 is configured to send configuration information to the terminal device to indicate the terminal device to determine, according to the configuration information, to use the first configured maximum transmit power and/or the second configured maximum transmit power to obtain a power headroom report.

The report receiving unit 430 is configured to receive the power headroom report reported by the terminal device.

The configuration information is used for indicating whether the terminal device uses the first mode or the second mode to determine the power headroom report.

For the power headroom report, reference is made to the first implementation described above and this will not be repeated herein.

Optionally, the indicating unit 420 is configured to send the configuration information to the terminal device through radio resource control (RRC) signaling or medium access control control element (MAC CE) signaling.

Optionally, the report receiving unit 430 is specifically configured to receive the power headroom report reported by the terminal device through the MAC CE signaling. For specific formats and contents of the MAC CE signaling, reference is made to the contents in the first implementation described above and this will not be repeated herein.

Optionally, the network configuring unit 410 is configured to configure the transmit power limit through a radio resource control information element (RRC IE).

Optionally, when the network device configures two cell groups, i.e., a first cell group and a second cell group, for the terminal device, the first cell group and the second cell group are in the same frequency band.

Optionally, the report receiving unit is configured to receive the power headroom report through the first cell group or the second cell group.

For nonexhaustive contents in the third implementation, reference is made to the same or corresponding portions in the first implementation described above and this will not be repeated herein.

The Fourth Implementation

Figure 12:
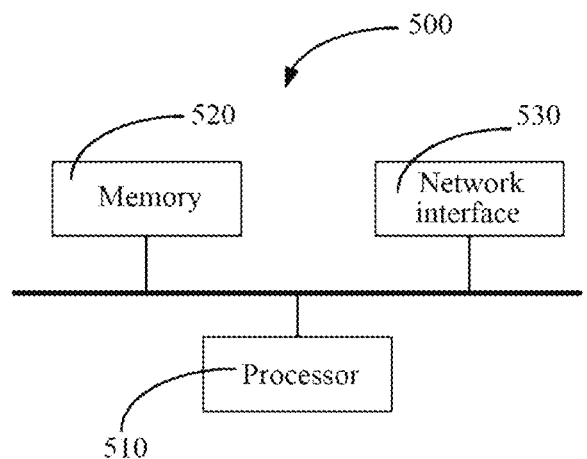
FIG. 12 is a schematic structure diagram of an apparatus for power headroom reporting in accordance with the fourth implementation of the present disclosure.

Referring to FIG. 12, it is a schematic structural diagram of an apparatus 500 for power headroom reporting in accordance with the fourth implementation of the present disclosure. The apparatus 500 includes a processor 510, a memory 520, and a network interface 530. The processor 510 invokes a program in the memory 520 to execute a method for power headroom reporting in accordance with the first implementation, and send out an execution result through the network interface 530.

The processor 510 may be an independent component or a unified name of a plurality of processing elements. For example, the processor may be a CPU, an ASIC, or one or more integrated circuits configured to implement the methods described above, such as at least one digital signal processor (DSP) or at least one field programmable gate array (FPGA).

The present disclosure is described with reference to flowcharts and/or block diagrams of the methods, devices (systems), and computer program products in accordance with the implementations of the present disclosure. It should be understood that each flow and/or block in the flowcharts and/or block diagrams, and combinations of flows and/or blocks in the flowcharts and/or block diagrams can be implemented by computer program instructions. These computer program instructions may be provided to a general purpose computer, a special purpose computer, an embedded processor, a chip, or processors of other programmable data processing devices to generate a machine, such that the instructions, which are executed by the computers or the processors of other programmable data processing devices, can generate an apparatus for implementing functions specified in one or more flows in the flowcharts and/or one or more blocks in the block diagrams. The program may be stored in a computer-readable storage medium, which may include a Read Only Memory (ROM), a Random Access Memory (RAM), a magnetic disk or optical disk, etc.

The above implementations illustrate but do not limit the present disclosure, and those skilled in the art can design a plurality of substitute examples within the scope of the claims. Those skilled in the art should recognize that appropriate adjustments, modifications, etc., can be made to specific implementations without departing from the scope of the present disclosure as defined in the appended claims. Therefore, any modifications and changes made in accordance with the spirit and principles of the present disclosure are within the scope of the present disclosure as defined by the appended claims.

The invention claimed is:

1. A method for power headroom reporting, comprising:
receiving, by a terminal device, a Radio Resource Control (RRC) signaling from a network device; wherein an information element (IE) of the RRC signaling comprises a transmit power limit of the terminal device in a cell group; wherein the transmit power limit is used for obtaining a power headroom report based on a first configured maximum transmit power that is determined based on the transmit power limit of the terminal device in the cell group;
determining, by the terminal device, according to a preset rule, to obtain a power headroom report based on a second configured maximum transmit power of the terminal device in the cell group in a case that uplink transmission of the terminal device on the cell group overlaps with a semi-statically configured downlink symbol of another cell group, or in a case that uplink transmission of the terminal device on the cell group does not overlap with uplink transmission on the another cell group, wherein the transmit power limit of the terminal device in the cell group is not taken into account when the second configured maximum transmit power is calculated, wherein the cell group comprises a Master Cell Group, or a Secondary Cell Group; and reporting, by the terminal device, the power headroom report;

wherein the power headroom report comprises a second power headroom and the second configured maximum transmit power, the second power headroom is obtained based on the second configured maximum transmit power.

2. The method of claim 1, further comprising:

determining, by the terminal device, according to the preset rule, to obtain the power headroom report based on the first configured maximum transmit power in a case that uplink transmission of the terminal device on the cell group overlaps with the semi-statically configured uplink or flexible symbol of the another cell group, or in a case that uplink transmission of the terminal device on the cell group overlaps with uplink transmission on the another cell group;

wherein the power headroom report further comprises a first power headroom and the first configured maximum transmit power; wherein the first power headroom is obtained based on the first configured maximum transmit power.

3. The method of claim 1, wherein reporting, by the terminal device, the power headroom report comprises: reporting, by the terminal device, the power headroom report through MAC CE signaling.

4. The method of claim 3, wherein, an order, in which the information is arranged, in the MAC CE signaling is preset by a protocol; and/or reserved bits in an MAC CE signaling format are used for indicating that corresponding information is one or more of the first power headroom, the second power headroom, the first configured maximum transmit power, and the second configured maximum transmit power.

5. The method of claim 1, wherein the power headroom report comprises type 1 PHR and type 3 PHR;

the type 1 PHR is to determine the power headroom according to a difference between a configured maximum transmit power of the terminal device and a transmit power of data channel; and the type 3 PHR is to determine the power headroom according to a difference between a configured maximum transmit power of the terminal device and a transmit power of channel sounding reference signal (SRS);

wherein the configured maximum transmit power comprises the first configured maximum transmit power and/or the second configured maximum transmit power.

6. An apparatus for power headroom reporting, comprising: a processor, a memory and a network interface, wherein the processor is configured to:

receive, through the network interface, a Radio Resource Control (RRC) signaling from the network device; wherein an information element (IE) of the RRC signaling comprises a transmit power limit of a terminal device in a cell group; wherein the transmit power limit is used for obtaining a power headroom report based on a first configured maximum transmit power that is determined based on the transmit power limit of the terminal device in the cell group; determine, according to a preset rule, to obtain a power headroom report based on a second configured maximum transmit power of the terminal device in the cell group in a case that uplink transmission of the terminal device on the cell group overlaps with a semi-statically configured downlink symbol of another cell group, or in a case that uplink transmission of the terminal device on the cell group does not overlap with uplink transmission on the another cell group, wherein the transmit power limit of the terminal device in the cell group is not taken into account when the second configured maximum transmit power is calculated, wherein the cell group comprises a Master Cell Group, or a Secondary Cell Group; and report, through the network interface, the power headroom report;

wherein the power headroom report comprises a second power headroom and the second configured maximum transmit power, the second power headroom is obtained based on the second configured maximum transmit power.

7. The apparatus of claim 6, wherein the processor is specifically configured to determine, according to the preset rule, to obtain the power headroom report based on the first configured maximum transmit power in a case that uplink transmission of the terminal device on the cell group overlaps with the semi-statically configured uplink or flexible symbol of the another cell group, or in a case that uplink transmission of the terminal device on the cell group overlaps with uplink transmission on the another cell group;

wherein the power headroom report comprises a first power headroom and the first configured maximum transmit power; wherein the first power headroom is obtained based on the first configured maximum transmit power.

8. The apparatus of claim 6, wherein the processor is specifically configured to report, through the network interface, the power headroom report through the MAC CE signaling.

9. The apparatus of claim 8, wherein an order, in which the information is arranged, in the MAC CE signaling is preset by a protocol; and/or reserved bits in an MAC CE signaling format are used for indicating that corresponding information is one of the first power headroom, the second power headroom, the first configured maximum transmit power, and the second configured maximum transmit power.

10. The apparatus of claim 6, wherein the power headroom report comprises type 1 PHR and type 3 PHR;

the type 1 PHR is to determine the power headroom according to a difference between a configured maximum transmit power of the apparatus and a transmit power of data channel; and the type 3 PHR is to determine the power headroom according to a difference between a configured maximum transmit power of the apparatus and a transmit power of channel sounding reference signal (SRS);

wherein the configured maximum transmit power comprises the first configured maximum transmit power and/or the second configured maximum transmit power.

11. An apparatus for power headroom reporting, comprising: a processor, a memory and a network interface, wherein the processor is configured to:

configure a cell group for a terminal device, wherein the cell group is configured with a transmit power limit of the terminal device through an information element (IE) of a Radio Resource Control (RRC) signaling, and a second configured maximum transmit power is determined for the terminal device in the cell group; wherein the transmit power limit is used for obtaining a power headroom report based on a first configured maximum transmit power that is determined based on the transmit power limit of the terminal device in the cell group;

send configuration information, through the network interface, to the terminal device to indicate the terminal device to determine, according to the configuration information, to use the second configured maximum transmit power to obtain a power headroom report in a case that uplink transmission of the terminal device on the cell group overlaps with a semi-statically configured downlink symbol of another cell group, or in a case that uplink transmission of the terminal device on the cell group does not overlap with uplink transmission on the another cell group; wherein the transmit power limit of the terminal device in the cell group is not taken into account when the second configured maximum transmit power is calculated; and receive, through the network interface, the power headroom report reported by the terminal device; wherein the power headroom report comprises a second power headroom and the second configured maximum transmit power, the second power headroom is obtained based on the second configured maximum transmit power;

wherein the cell group comprises a Master cell group (MCG), or a Secondary cell group (SCG).

* * * * *